United States Patent [19]

Kakumoto et al.

[11] 4,422,032
[45] Dec. 20, 1983

[54] BATTERY CHARGING CIRCUIT FOR MAINTAINING A SUBSTANTIALLY CONSTANT AVERAGE VALUE OF CHARGING CURRENT DESPITE VARIATIONS IN CHARGING VOLTAGE

[75] Inventors: Hiromi Kakumoto; Kaoru Furukawa, both of Hikone, Japan

[73] Assignee: Matsushita Electric Works, Ltd., Osaka, Japan

[21] Appl. No.: 231,006

[22] Filed: Feb. 3, 1981

[30] Foreign Application Priority Data

Feb. 14, 1980 [JP] Japan .................................. 55-16842

[51] Int. Cl.³ .............................................. H02J 7/10
[52] U.S. Cl. .................................... 320/39; 320/32; 363/19; 363/37; 363/142
[58] Field of Search ................... 320/2, 22, 23, 39, 40, 320/32; 363/19, 142, 143, 37

[56] References Cited

U.S. PATENT DOCUMENTS

| | | | |
|---|---|---|---|
| 3,435,320 | 3/1969 | Lee et al. ............................. | 363/19 |
| 3,869,657 | 3/1975 | Shoji et al. ........................... | 320/39 |
| 4,021,717 | 5/1977 | Furuishi et al. ..................... | 320/23 |
| 4,172,276 | 10/1979 | Kameya ............................. | 363/19 |
| 4,187,536 | 1/1980 | Govaert ............................. | 320/2 |

OTHER PUBLICATIONS

Electrical Design News, vol. 15, No. 2, pp. 65–67, Jan. 1970.

*Primary Examiner*—William H. Beha, Jr.
*Attorney, Agent, or Firm*—Birch, Stewart, Kolasch & Birch

[57] ABSTRACT

A battery charger includes a transistor inverter. The transistor inverter includes an oscillation transformer and a switching transistor for controlling a current flowing through a primary coil of the oscillation transformer. This current charges the battery when the transistor is on. While the switching transistor is in an off state, charging current is supplied to the battery from a secondary coil of the oscillation transformer. The period of time where the switching transistor is in an on state is controlled depending on the amplitude of a supply voltage. Accordingly, the average value of a charging current to the rechargeable battery is automatically kept substantially constant despite variations in the amplitude of the alternating current voltage supply.

6 Claims, 22 Drawing Figures

BATTERY CHARGING CIRCUIT FOR MAINTAINING A SUBSTANTIALLY CONSTANT AVERAGE VALUE OF CHARGING CURRENT DESPITE VARIATIONS IN CHARGING VOLTAGE

BACKGROUND OF THE INVENTION

1. Field of the Invention

The present invention relates to a charging apparatus. More particularly, the present invention relates to an improvement in a charging apparatus for supplying a high frequency charging current to a rechargeable battery by the use of an inverter including a semiconductor switching element.

2. Description of the Prior Art

For example, rechargeable batteries are housed in a variety of small-sized, electric appliances including electric shavers. These electric appliances housing such rechargeable batteries are very convenient to use due to the feasibility of recharging the rechargeable battery if they are plugged into a commercial power supply, for example. However, a line voltage of the commercial power supply differs in various countries. An adapter which is compatible with different line voltages in these different countries is therefore necessary in order to recharge the rechargeable battery from these different line voltages. Such an adapter, however, is bulky and inconvenient to carry during travel, etc. Furthermore, there is the possibility of causing fire or other troubles in the event that an electric appliance for 100 volts use is inadvertently plugged into a commercial power line carrying for example 240 volts. In recent years, several approaches have been proposed in an attempt to develop a charger for use with a rechargeable battery which is adaptable to different line voltages without the need for the above mentioned adapter. A typical example of those approaches is disclosed in the U.S. Pat. No. 3,599,071 issued Aug. 10, 1971 to Robert Henri Lapuyade, for example. In U.S. Pat. No. 3,599,071, there is provided a transformer supplied with the commercial power supply. A plurality of voltage selection taps are connected to a primary coil of the transformer, one of which is manually selectable depending on the power line voltage available in the country where the user is to use the charger. However, the transformer as proposed in U.S. Pat. No. 3,599,071 is inferior in efficiency due to its iron and copper losses. Since a charging current having the commercial power frequency is supplied in the apparatus disclosed in U.S. Pat. No. 3,599,071, the transformer should be large in size and an electric appliance housing those components also should be large in size. Moreover, since the taps on the transformer are manually selectable, a failure or a mistake to select a manual switch results in various troubles as set forth above. Due to provision of the manual switch and the voltage selection taps on the transformer a further increase in size of electric appliances with such a built-in charger is unavoidable.

Chargers using a transistor inverter rather than the transformer as taught by the above referenced U.S. Pat. No. 3,599,071 have recently been proposed and deemed as more practical. FIG. 1 is a circuit diagram of an example of the prior art inverter type chargers which is relevant to the background of the present invention. An alternating current voltage supply 1 such as the commercial power source is connected to a rectifier 2. Supplied from the rectifier 2 to an inverter 3 is a pulsating output which is half-wave rectified from the alternating current voltage supply. The inverter 3 converts the output of the rectifier 2 into a high frequency voltage which in turn is rectified to provide a charging current for a rechargeable battery 9 such as a Ni-Cd battery. This inverter type of charger is well known in U.S. Pat. No. 3,869,657 issued Mar. 4, 1975 to Shoki et al and assigned to the assignee of the present application and so forth. To give a better understanding of the present invention, the circuit of FIG. 1 will now be described in more detail.

A resistor 21 included in the rectifier 2 is of a self-burning type which serves to shut off a primary circuit when a secondary circuit is out of order. An inductor 22 and a capacitor 24 included in the rectifier 2 form a noise filter. The inverter 3 includes a primary coil 41 of an oscillation transformer. Interposed in a current path or a primary current path of the power converter 4 is a switching circuit 5 which comprises a switching transistor 51 with its base connected to an accelerator circuit 7 which is enabled with a trigger signal from a trigger signal generator 6. The trigger signal generator 6 comprises a series connection of a resistor 61 and a parallel circuit including a resistor 62 and a capacitor 63. The trigger signal is derived from the junction of the series connection and supplied to the base of the transistor 51 through a base feedback coil 71 included in the accelerator circuit 7. The base feedback coil 71 is included in the oscillation transformer with magnetic coupling with its primary coil 41. The primary coil 41 of the oscillation transformer is also magnetically coupled with its secondary coil 82 included in a secondary output rectifier 8. This secondary output rectifier 8 includes a diode 81 for rectification of the output from the secondary coil 82. The output of the diode 81 is supplied as the charging current to the rechargeable battery 9.

The above described charger operates in the following manner. The alternating current output from the alternating current voltage supply 1 is half-wave rectified by means of the rectifying diode 23 in the rectifier 2 and then supplied in the form of a pulsating waveform to the trigger signal generator 6 included in the inverter 3. A current flows through the resistor 61 to charge the capacitor 63. Depending on the charging voltage on the capacitor 63 the base-emitter voltage ($V_{BE}$) of the switching transistor 51 increases. As soon as the base-emitter voltage ($V_{BE}$) is in excess of the operating threshold level of the transistor 51, the transistor 51 starts turning on to permit a primary current I1 shown in FIG. 2A to flow through the collector-to-emitter path of the transistor 51 and in other words the primary coil 41 of the oscillation transformer. The primary current I1 flowing the primary coil 41 results in developing an induced voltage on the base feedback coil 71. The base feedback coil 71 operates in a direction to increase a base-emitter current ($I_{BE}$) as depicted in FIG. 2B and to effect positive feedback to the switching transistor 51. Under these circumstances the switching transistor 51 becomes completely conductive in a very brief period of time. If the current I1 flowing through the primary coil 41 increases as shown in FIG. 2A, then the induced current will be no longer supplied to the base feedback coil 71 in response to the primary coil 41 being magnetically saturated or a collector-emitter current ($I_{CE}$) of the transistor 51 being saturated. Since a current supply to the base is prohibited in this manner, the transistor 51 becomes non-conductive. Once the switching transistor 51 has been turned off a voltage is induced in the opposite direction on the primary coil 41, reversing the direction of the current flowing through the base feedback coil 71 as seen from FIG. 2B. The switching transistor 51 is thus reversely biased to accelerate the turning off thereof. When the reverse voltage is induced on the base feedback coil 71 as depicted in FIG. 2B, there is developed a secondary current I2 as shown in FIG. 2C in the secondary coil 82 in the direction of conducting the diode 81. The secondary current I2 is supplied as the charging current to the rechargeable battery 9 via the diode 81.

The series connection of a capacitor 42 and a resistor 43 included in the power converter 4 serves to absorb a spike voltage at the primary coil 41 and suppress noise. A semi-fixed resistor 52 connected to the emitter of the transistor 51 in the switching circuit 5 is to limit the primary current I1. In other words, with adjustments of the semi-fixed resistor 52, the primary current I1 may be varied. The resistor 61 in the trigger signal generator 6 functions as a starting resistor which turns the switching transistor 51 on under an initial state, while the capacitor 63 serves to accelerate the turning on of the switching transistor 51. The resistor 62 connected to the capacitor 63 functions as a discharging resistor for the capacitor 63. The charge on the capacitor 63 is furnished to the base feedback coil 71 through the resistor 62, thus accelerating the turning on of the switching transistor 51.

The inverter type charger as described above has advantages over U.S. Pat. No. 3,559,071 in that it eliminates the need for a large-sized transformer and reduces space requirements of electric appliances to a minimum. The inverter type charger as shown in FIG. 1 however has problems as follows. If the commercial power supply of for example 240 volts, higher than the rated voltage of for example of 100 volts, is connected as the alternating current voltage supply, then there is developed an increase in the input voltage $V_{IN}$ supplied to the inverter 3 via the rectifier 2. This further leads to an increase in the charging current supplied from the secondary output rectifier 8 to the rechargeable battery 9 and adds a possibility of the overcharging of the rechargeable battery 9. Furthermore, if the input voltage $V_{IN}$ is too high, the oscillation transformer becomes saturated, increasing iron loss and calorific value of a core about which the coils 41, 71 and 82 are commonly wound. Such heat gives the user of electric appliances uneasy and disagreeable impression. In addition, in the light of the high voltage $V_{IN}$ semiconductor elements such as diodes and transistors with high ratings should be selected at the stage of circuit design with an accompanying increase in cost.

As pointed out previously, no effective approach has been proposed for the inverter system charger heretofore which provides a proper charging current in response to different supply voltages from alternating current voltage supplies such as the commercial power supplies in different countries and offers many advantages as compared with the present invention.

SUMMARY OF THE INVENTION

In summary, the present invention meets the above described requirements by controlling the on-interval of a semiconductor switching element included in an inverter depending on the supply voltage of an alternating current voltage supply and controlling a charging current to be supplied from the inverter to a rechargeable battery. Pursuant to the present invention the charging current is maintained substantially constant in spite of different supply voltages. This eliminates the need to actuate a manual switch and the possibility of inadvertent erroneous actuations thereof. Furthermore, the charger is of the inverter type with a maximum of efficiency and a minimum of size. Electric appliances housing such chargers may therefore be of small size and less bulky and convenient to carry. In addition, since the on-interval of the switching element is controlled so as to keep the charging current constant according to the present invention, there is developed little or no heat which tends to heat the housings for the electric appliances due to different supply voltages. This does not give the user an uneasy feeling. In addition, the present invention provides flexibility for a variety of different supply voltages by means of a common apparatus.

In a preferred embodiment of the present invention, the amount of electromagnetic energy accumulated on a core of an oscillation transformer during the on-interval is monitored to control the length of the on-interval. In other words, a voltage proportional to a current flowing through a primary coil or a secondary coil of the oscillation transformer is derived and compared with a predetermined reference voltage. If the proportional voltage reaches the reference voltage, then it forcedly turns off the semiconductor switching element in the inverter.

In another preferred embodiment of the present invention, the peak value of the current flowing the primary circuit of the inverter is directly sensed to control the length of the on-interval. In other words, the voltage is sensed which is developed across both ends of a resistor interposed in a path for the primary current. When the voltage across the resistor reaches the predetermined reference voltage, the switching element in the inverter is forced into an on condition. It is more preferable to provide a compensator where the higher the input voltage to the inverter or the supply voltage the greater the gradient of the voltage developed across the both ends of the resistor. The compensator serves to keep the length of the on-interval of the semiconductor switching element from becoming too short. The provision of the compensator therefore eliminates the need for a semiconductor switching element whose response is extremely quick.

In still another preferred embodiment of the present invention, there is provided an oscillator which has an oscillation period longer than the natural oscillation period of the inverter. While falling to a low level, the output of the oscillator forces the semiconductor element into an off condition during that period. According to the preferred embodiment, the average value of output current to the rechargeable battery is easily adjustable at its optimum value through proper selection of the oscillation period of the oscillator. This allows great flexibility in design of the charger.

Moreover, in another embodiment, there is provided a spike voltage absorber circuit connected in parallel with the primary coil of the oscillation transformer included in the inverter. This spike voltage absorber circuit reduces remarkably power dissipation as experienced during the on-interval of the semiconductor switching element, thus enhancing efficiency of the inverter.

Accordingly, it is a primary object of the present invention to provide a charging apparatus of an inverter system which may automatically maintain a charging current to a rechargeable battery substantially constant despite different alternating current supply voltages.

One of the significant advantages of the present invention is that it provides great flexibility in circuit design in keeping the average value of the charging current to the rechargeable battery substantially constant.

Another significant advantage of the present invention is that semiconductor switching elements which are operable at very high speed are not required.

Still another advantage of the present invention is that the charger is adaptable to a variety of different supply voltages by means of a common apparatus.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
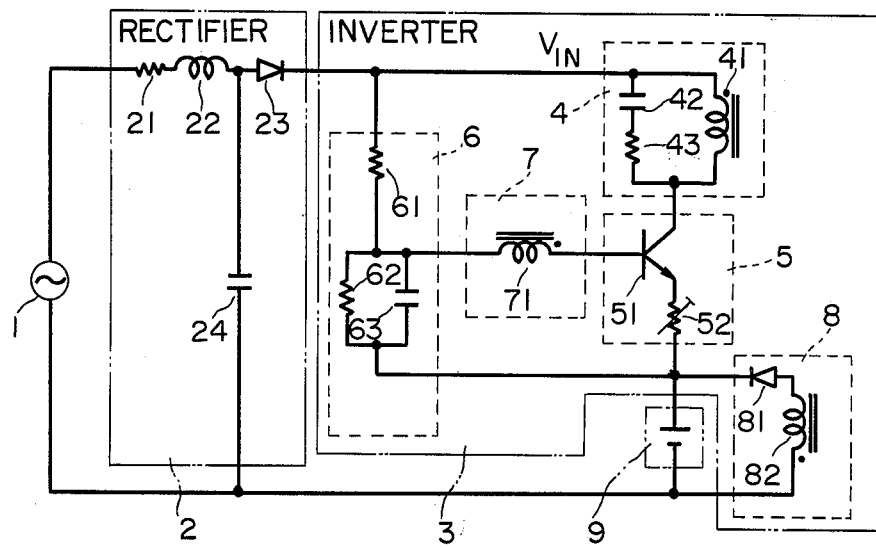
FIG. 1 is a circuit diagram of an example of prior art inverter type chargers which is the background of the present invention.
Figure 3:
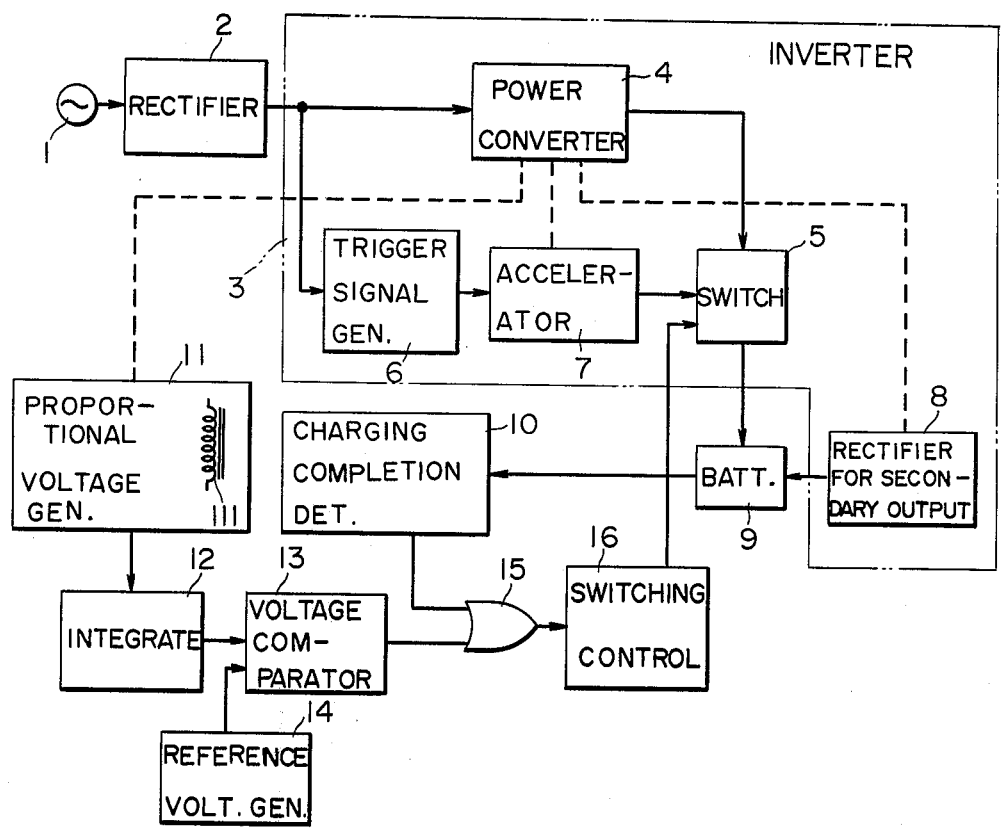
FIG. 3 is a schematic block diagram showing an embodiment of the present invention.

FIG. 3 is a schematic diagram showing an embodiment of the present invention wherein the rectifier 2 and the inverter 3 are substantially similar to those in FIG. 1 as to structure. Details of structure and operation of the inverter 3 are not discussed herein.

In this embodiment there is provided a voltage generator 11 which generates a voltage having an amplitude proportional to the supply voltage from the alternating current voltage supply 1. The proportional voltage generator 11 may include a tertiary coil 111 magnetically coupled with the oscillation transformer having the coils 41, 71 and 82 (FIG. 1). The output of the proportional voltage generator 11 is therefore a direct current voltage of an amplitude proportional to the supply voltage from the alternating current voltage supply 1 or the input voltage $V_{IN}$ to the inverter 3. The proportional voltage is fed from the proportional voltage generator 11 to an integrating circuit 12. The output of the integrating circuit 12 is supplied as an input to a voltage comparator 13 which also receives its other input a reference voltage Vref2 from a reference voltage circuit 14. Accordingly, the voltage comparator 13 compares the output voltage of the integrating circuit 12 with the reference voltage Vref2 and, if the output of the integrating circuit 12 reaches the reference voltage Vref2', provides a high level output. The output of the voltage comparator 13 is fed as an input to a logic OR gate 15.

The battery voltage of the rechargeable battery 9 is supplied to a charging completion detector 10. The charging completion detector 10 includes, for example, a voltage comparator (not shown) and compares the battery voltage with a given reference voltage Vref1. When the battery voltage reaches the given reference voltage Vref1, the charging completion detector 10 senses the completion of charging and provides a high level output. The output of the charging completion detector 10 is fed as the other input to the above mentioned logic OR gate 15. It is noted that the charging completion detector 10 may comprise a well-known temperature sensor, a well-known internal gas pressure sensor or the like. The output of the logic OR gate 15 is supplied to a switching control circuit 16 which includes a switching element (not shown) such as a transistor for controlling the on-interval $T_{ON}$ of the switching transistor 51 (FIG. 1) in the switching circuit 5 included within the inverter 3. To sum up, in the embodiment of the FIG. 3, the voltage proportional to the input voltage $V_{IN}$ is developed from the proportional voltage generator 11 and integrated by means of the integrating circuit 12. If the output voltage of the integrating circuit 12 is equal to the fixed value or Vref2, then the high level output of the voltage comparator 13 is fed to the switching control circuit 16 via the logic OR gate 15. The switching control circuit 16 forces the switching circuit 1 included in the inverter 3 into the off condition. If the charging completion detector 10 senses the completion of the charging of the rechargeable battery 9, then its output is supplied to the switching control circuit 16 via the logic OR gate 15, forcibly bringing the switching circuit 5 into the off condition by way of the switching control circuit 16. In other words, the circuits 11, 12, 13, 14, 15 and 16 function to control the length of the on-interval $T_{ON}$ of the switching circuit 5. The following will set forth the operating principle of the present invention.

Pursuant to the operating principle of the present invention, the secondary power E2 and the secondary voltage VO are held constant despite variations in the input voltage $V_{IN}$ by controlling the on-interval $T_{ON}$ as described above so that the charging current of substantially a fixed value is fed to the rechargeable battery in spite of different amplitudes of the supply voltage from the alternating current voltage supply.

Figure 2A:
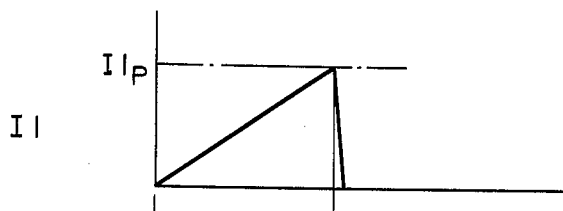
FIGS. 2A to 2C are current waveform diagrams for explanation of operation of the circuit shown in FIG. 1.
Figure 2B:
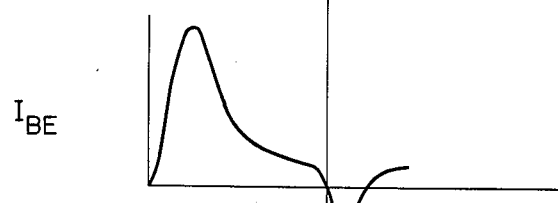
Figure 2C:
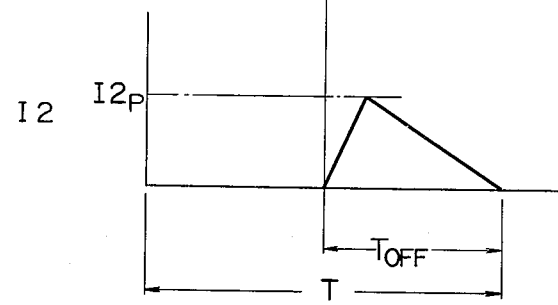

Referring now to FIG. 2A, a current flowing through the primary coil 41 (FIG. 1) of the oscillation transformer during the on-interval $T_{ON}$ of the transistor 51 in the switching circuit 5 or the peak value I1p of the primary current I1 can be defined by the following equation (1):

$$I1p = \frac{V_{IN}}{L1} \cdot T_{ON} \qquad (1)$$

wherein L1 is the inductance of the primary coil 41 and $V_{IN}$ is the input voltage to the inverter 3. Energy $\Delta E1$ which is accumulated on a core (not shown) of the oscillation transformer during the on-interval $T_{ON}$ is defined by the following equation (2):

$$\Delta E1 = \frac{L1}{2} \cdot I1p^2 \qquad (2)$$

No current flows through the secondary coil 82 (FIG. 1) while the transistor 51 is within the on-interval $T_{ON}$. At the moment where the transistor 51 is turned off a current I2 flows through the secondary coil 82. The following equation (3) defines the peak value I2p of the current I2 flowing through the secondary coil 82:

$$I2p = \frac{n1}{n2} \cdot I1p \qquad (3)$$

wherein n1 and n2 are the numbers of turns of the primary coil 41 and the secondary coil 82. The average $\overline{IO}$ of the charging current IO flowing through the rechargeable battery 9 or the current flowing through the secondary coil 82 is defined by the following equation (4):

$$\overline{IO} = \tfrac{1}{2} \cdot I2p \cdot \frac{T_{OFF}}{T} \qquad (4)$$

where T is the oscillation period of the inverter 3 and $T_{OFF}$ is the off-interval of the switching transistor 51 (FIG. 1).

The relationship between the average value $\overline{VO}$ of the secondary output voltage VO and the efficiency $\eta$ of the inverter 3 can be represented by the following equation (5):

$$\eta \cdot \frac{\Delta E1}{T} = \overline{VO} \cdot \overline{IO} \qquad (5)$$

The off-interval $T_{OFF}$ of the transistor 51 can be written by the following equation (6) depending on the above defined equations:

$$T_{OFF} = \frac{L1}{\overline{VO}} \cdot \frac{I1p^2}{I2p} \qquad (6)$$

$$= \eta \cdot \frac{L1}{\overline{VO}} \cdot \frac{n2}{n1} \cdot I1p$$

$$= \eta \cdot \frac{V_{IN}}{\overline{VO}} \cdot \frac{n2}{n1} \cdot T_{ON}$$

On the other hand, the secondary power E2 can be defined by the following equation (7):

$$E2 = \overline{VO} \cdot \overline{IO} \qquad (7)$$

$$= \overline{VO} \times \left( \tfrac{1}{2} \cdot \frac{n1}{n2} \cdot I1p \cdot \frac{T_{OFF}}{T} \right)$$

-continued $$= \frac{\overline{VO}}{2} \cdot \frac{n1}{n2} \cdot I1p \cdot \frac{\eta \cdot \frac{L1}{\overline{VO}} \cdot \frac{n2}{n1} \cdot I1p}{\left( \eta \cdot \frac{L1}{\overline{VO}} \cdot \frac{n2}{n1} + \frac{L1}{V_{IN}} \right) \cdot I1p}$$

$$= \tfrac{1}{2} \cdot I1p \cdot \frac{\eta}{\eta \cdot \frac{L1}{\overline{VO}} \cdot \frac{n1}{n2} + \frac{1}{V_{IN}}}$$

$$= \tfrac{1}{2} \cdot \frac{\eta \cdot V_{IN}}{\eta \cdot \frac{V_{IN} \cdot n2}{\overline{VO} \cdot n1} + 1} \cdot I1p$$

Depending on the above equation (7), the condition for maintaining the secondary power E2 and the secondary voltage $\overline{VO}$ constant without regard to variations in the input voltage $V_{IN}$ can be written by the following equation (8):

$$I1p = 2 \cdot \overline{VO} \cdot \overline{IO} \cdot \frac{\eta \cdot \frac{1}{\overline{VO}} \cdot \frac{n2}{n1} + \frac{1}{V_{IN}}}{\eta} \qquad (8)$$

$$= \overline{IO} \left( 2 \cdot \frac{n2}{n1} + \frac{\overline{VO}}{\eta \cdot V_{IN}} \right)$$

$$= K1 + \frac{K2}{V_{IN}}$$

$$K1 = 2 \cdot \overline{IO} \cdot \frac{n2}{n1}$$

$$K2 = \frac{\overline{VO}}{\eta} \cdot \overline{IO}$$

The efficiency $\eta$ can be regarded as constant although it varies slightly according to the supply voltage from the alternating current voltage supply.

As a result, depending on the above equation (1), the on-interval $T_{ON}$ of the switching transistor 51 (FIG. 1) is given by the following equation (9):

$$T_{ON} = \frac{K1'}{V_{IN}} + \frac{K2'}{V_{IN}^2} \qquad (9)$$

$$K1' = K1 \cdot L1$$

$$K2' = K2 \cdot L1$$

In this manner, the secondary output or the charging current of a fixed amplitude is provided by varying the length of the on-interval $T_{ON}$ depending on the input voltage $V_{IN}$. To control the on-interval $T_{ON}$, the circuits 11 and 16 are provided in FIG. 3. Likewise reference voltages Vref2' and Vref3 to be described below the reference voltage Vref2 are properly selected before the primary current I1 becomes saturated, in the light of the magnetic saturation properties of the oscillation transformer or the saturation properties of the collector-emitter current of the switching transistor 51 (FIG. 1). Therefore, the reference voltage Vref2 and the time constant of the integrating circuit 12 are properly selected so that the charging current may be held substantially constant even when the supply voltage varies within the range of 100–270 volts, for example.

Figure 4:
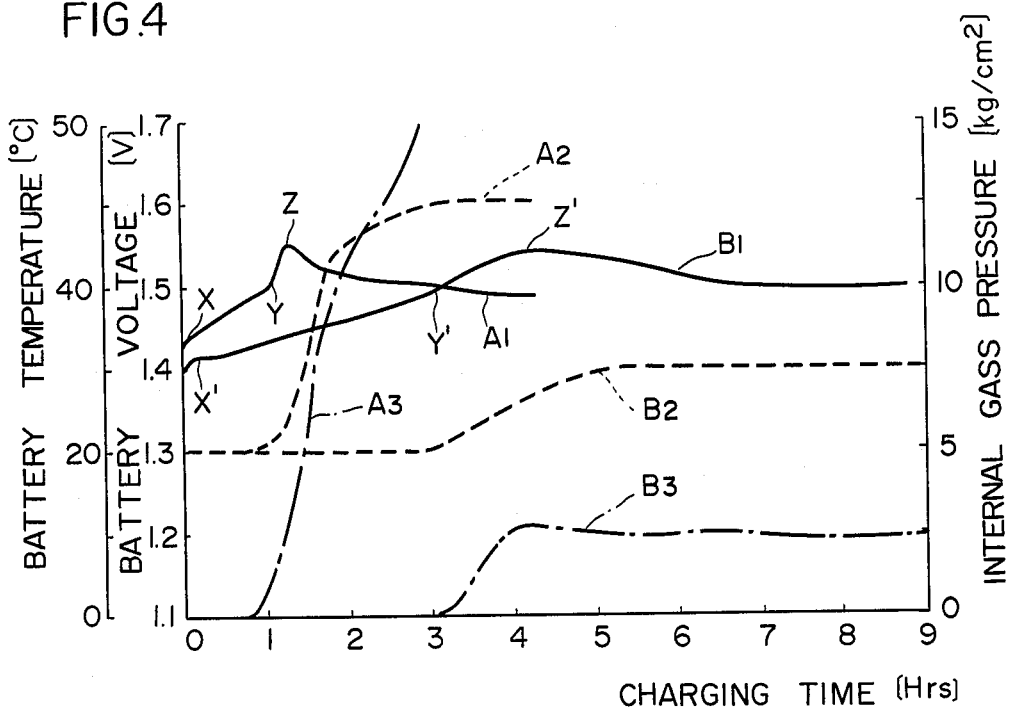
FIG. 4 is a graph for explanation of operation of a charging completion detector with abscissa indicating a charging time and ordinate indicating a battery temperature, battery voltage and internal gas pressure.

When the quick charging of the rechargeable battery 9 such as a Ni-Cd battery is desirable, trickle charging should be performed with a limited charging current to prevent overcharging after the completion of charging. The circuits which avoid such overcharging during quick charging are the charging completion detector 10 and the circuits 15 and 16. The charging completion detector 10, as discussed previously, includes a voltage comparator (not shown) which is supplied with the reference voltage Vref1. In the case of a so-called quick charging with an increased charging current and a shortened charging interval, there is a likelihood that the rechargeable battery 9 will not undergo leakage of the electrolyte included therein, overcharging or overdischarging nor a shortened operating life if the charging current is selected in its optimum conditions including current amplitude and charging interval. FIG. 4 is a graph indicating variations in the battery voltage, battery temperature and internal gas pressure when quick charging was effected on the rechargeable battery such as a Ni-Cd battery for 1 hour and 3 hours, respectively. The results of measurements of the battery voltage, battery temperature and internal gas pressure with an ambient temperature of 20° C. are plotted in the graph of FIG. 4. Using a Ni-Cd battery with a discharging capacity of 450 mAHr, charging was effected with a charging current 1C for 1 hour quick charging and with a charging current $\frac{1}{3}$C for 3 hours quick charging. In FIG. 4, a family of curves generally designated A show the 1 hour quick charging and the curves A1, A2 and A3 show variations in the battery voltage, battery temperature and internal gas pressure at that time. In addition, a second family of curves generally designated B shows the 3 hours charging and especially the curves B1, B2 and B3 show variations in the battery voltage, battery temperature and internal gas pressure at that time. It is evident from FIG. 4 that there is developed in the curve A1 representing variations in the battery voltage in effecting the 1 hour quick charging a first turning point X standing immediately after the begining of charging, a second turning point Y standing immediately before the completion of charging and a third turning point Z showing the maximum voltage at the completion of charging. Analysis of the curves A2 and A3 reveals that the battery temperature and internal gas pressure start increasing immediately after the second turning point Y. The internal gas pressure amounted to approximately 15 Kg/cm² within 3 hours of the beginning of charging. Having passed the turning point Y, the battery temperature increases upon the passage of time and demonstrates a gradual increase in an overcharging region. The quantity of a current supplied to the rechargeable battery is transduced into thermal energy in the interior of the battery within the overcharging region, thus increasing the temperature of the battery. However, heat generation and heat radiation may be kept in a balanced relationship at a specific point since heat radiation from the battery to the surrounding atmosphere increases in proportion to the difference between the battery temperature and the surrounding temperature. Internal gas pressure as depicted by the curve A3 exhibits a specific property wherein the gas pressure keeps on increasing until it reaches the operating pressure of a safety valve (not shown) installed within the battery. In this instance, upon actuation of the valve the electrolyte will begin leaking. In order that the rechargeable battery 9 may undergo quick charging for less than 1 hour, a special gas pressure absorbent is used to accommodate the internal gas pressure within the range of 18-25 Kg/cm², for example However, due to structural and economical requirements of the rechargeable battery, no completely satisfactory rechargeable battery has been on the market. In the past years, an approach was proposed to monitor variations resulting from the charging of the rechargeable battery in terms of one or both of the above-mentioned battery voltage and battery temperature and to lower the internal gas pressure such that the charging current becomes saturated when the internal gas pressure is below the operating pressure of the safety valve, for example, 5-10 Kg/cm². To this end, for quick charging by a so-called voltage controlled charger it is necessary to detect voltage level between the turning points Y and Z on the curve A1 in FIG. 4. Accordingly, in the embodiment of FIG. 3, the reference voltage Vref1 is established in the voltage comparator (not shown) within the charging completion detector 10 so that trickle charging may be effected between the turning point Y where the charging capacity is within 85-90%, for example, and the turning point Z where the charging capacity is within 110-120%, for example.

Referring now to FIGS. 5 to 11, specific preferred embodiments pursuant to the operating principle of the scheme of FIG. 3 will be described in detail.

Figure 5:
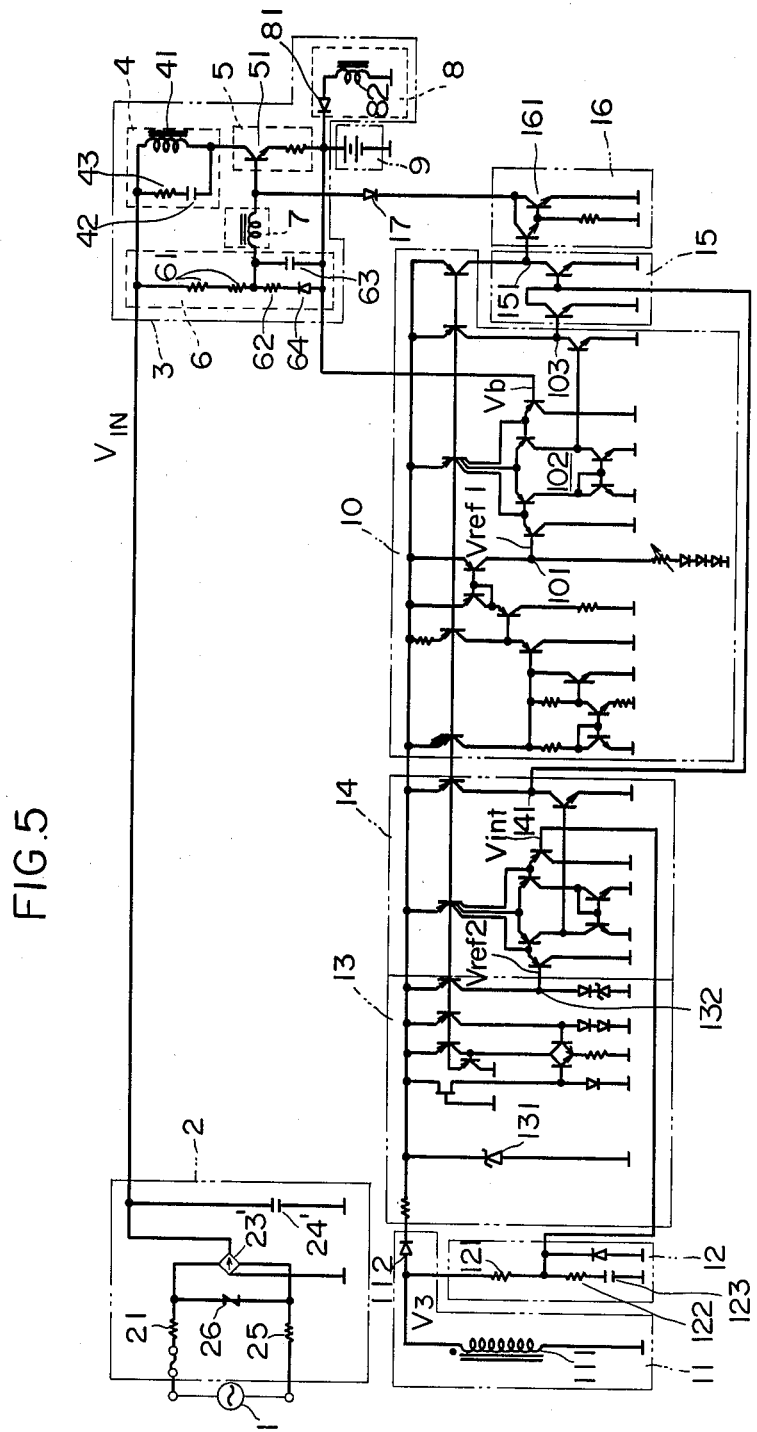
FIG. 5 is a detailed circuit showing a preferred embodiment of the present invention constructed in accordance with the principle of the block diagram of FIG. 3.

FIG. 5 is a detailed circuit diagram of a preferred embodiment of the present invention, wherein similar reference designations are used to represent circuits similar to those in the block diagram of FIG. 3. The inverter 3 in FIG. 5 is identical with that in FIG. 1 with detailed description thereof omitted herein.

The proportional voltage generator 11 includes a tertiary coil 111 with magnetic coupling with the primary coil 41 of the oscillation transformer and an induced voltage V3 on the coil 111 is used as the proportional voltage. The output V3 of the tertiary coil 111 is supplied to the integrating circuit 12 which includes a series connection of resistors 121 and 122 and a capacitor 123. An integrating voltage Vint is derived from the junction between the resistors 121 and 122. The output of the tertiary coil 111, on the other hand, is rectified via a diode 112, stabilized as to a voltage via a zener diode 131 included in the reference voltage circuit 13 and supplied as an enabling voltage to the respective circuits 10, 13, 14, 15 and 16. The reference voltage circuit 13 includes a current mirror circuit connected to a constant current source and provides the reference voltae Vref2 from a junction 132. Thus, the voltage comparator 14 receives the reference voltage Vref2 and the voltage Vint and provides its output from a junction 141 to an input to the logic OR gate 15. The charging completion detector 10 also includes a reference voltage circuit for generating the reference voltage Vref1 at its junction 101. This reference voltage Vref1 is supplied to an input to a voltage comparator 102 which also receives as its other input the battery voltage Vb of the rechargeable battery 9. The output of the voltage comparator 102 is fed as the remaining input to the logic OR gate 15 through a junction 103. The output of the logic OR gate 15 is delivered from a junction 151 and suppled to the switching control circuit 16. The switching control circuit 16 includes a switching transistor 161 which controls the on-interval $T_{ON}$ of the switching transistor 51 within the switching circuit 5 depending on its on and off conditions. It is noted that a diode 17 is to prevent a reverse current from flowing from the switching control circuit 16 to the switching circuit 5. The following will set forth the operation of the embodiment of FIG. 5.

If the alternating current voltage supply is turned on, then the inverter 3 begins oscillating. At this moment the rechargeable battery 9 has not yet been charged and the voltage across both ends of the battery or the battery voltage Vb is substantially zero. Since the reference voltage Vref1 is higher than the battery voltage Vb under the circumstance, the voltage comparator 102 in the charging completion detector 10 provides its low level output. Since the output 141 of the voltage comparator 14 is also at a low level, the output 151 of the logic OR gate 15 remains at a low level. Consequently, the switching transistor 161 included in the switching control circuit 16 rests in its off condition. As long as the switching transistor 161 is in the off condition, the transistor 51 in the switching circuit 5 included within the inverter 3 remains in its on condition. While the switching transistor 51 is within the on-interval $T_{ON}$, the primary current I1 flowing through the primary coil 41 of the oscillation transformer increases gradually (FIG. 2A). Developed on the tertiary coil 111 magnetically coupled with the primary coil 41 and forming the voltage generator 11 is the voltage V3 which is proportional to the supply voltage from the coil voltage supply 1 or the input voltage $V_{IN}$ to the inverter 3. Assuming n3 is the number of turns of the tertiary coil 111 and n1 is the number of turns of the primary coil 41, the voltage V3 induced on the tertiary coil 111 can be defined by equation (10):

$$V3 = \frac{n3}{n1} \cdot V_{IN} = K3 \cdot V_{IN} \qquad (10)$$

$$K3 = \frac{n3}{n1}$$

The voltage V3 is charged on the capacitor 123 via the resistors 121 and 122 included in the integrating circuit 12. The integrating circuit 12, therefore, provides the integrating voltage Vint as the voltage appearing across both ends of the capacitor 123. This voltage Vint is compared with the reference voltage Vref2 within the voltage comparator 14. The voltage comparator 14, when the voltage Vint reaches the reference voltage Vref2, provides its high level output 141, thus turning on the switching transistor 161 in the switching control circuit 16 by way of a logic OR gate 10. Once the switching transistor 161 has been turned on, the switching transistor 51 in the switching circuit 5 included within the inverter 3 is forcedly brought into its off condition. As a result of this, the on-interval $T_{ON}$ of the switching transistor 51 is governed by the switching control circuit 16. As an example of circuit design, the integrating voltage Vint is selected such that it amounts to the reference voltage Vref2 immediately before the oscillation transformer becomes magnetically saturated or the collectoremitter current ($I_{CE}$) of the switching transistor 51 becomes saturated.

In the case where the alternating current supply voltage 1 is relatively low (say, 100 volts), it takes a relatively long period of time for the voltage Vint from the integrating circuit 12 to reach the above described reference voltage Vref2. If the voltage Vint reaches the reference voltage Vref2, then the output 141 of the voltage comparator 14 assumes the high level. Similarly, the output of the logic OR gate 15 assumes the high level, turning on the switching transistor 161 in the switching control circuit 16. After the switching transistor 161 has been turned on, a negative pulse current or an off signal is fed to the base of the switching transistor 51 included in the switching circuit 5. In response to this negative pulse current the switching transistor 51 is abruptly turned off. In response to the switching transistor 51 being turned off, electromagnetic energy cumulated on the oscillation transformer is released toward the rechargeable battery 9 through the secondary output rectifier 8. The rechargeable battery 9 is charged by not only the primary current I1 but also the secondary current I2 during the off-interval $T_{OFF}$ of the switching transistor 51. During the off-interval $T_{OFF}$ the charge on the capacitor 123 included in the integrating circuit 12 is discharged through the resistors 121 and 122 to reset the integrating circuit 12. If the battery voltage Vb reaches the reference voltage Vref1 during the charging of the rechargeable battery 9, then the output 103 of the charging completion detector 10 assumes the high level useful in forcedly bringing the switching transistor 161 in the switching control circuit 16 into its on condition. Thereafter, even if the output 141 of the voltage comparator 14 assumes the low level, the switching transistor 161 remains in its on condition. The trigger signal to be supplied to the base of the switching transistor 51 is bypassed and prevented from being applied thereto so that the inverter 3 discontinues oscillating. Thereafter, in the event that the battery voltage Vb of the rechargeable battery 9 falls below the reference voltage Vref1 due to natural discharge or the like, the above procedure is repeated to initiate oscillation of the inverter 3 in order to effect the recharging of the rechargeable battery 9. Since the battery voltage Vb of the rechargeable battery 9 is generally slightly lower than the reference voltage Vref1, the recharging is effected during the on-interval $T_{ON}$ of the switching transistor 51 of the inverter 3 which is about 1/2–1/5 of that in the initial charging. Therefore, the charging current is reduced correspondingly to prevent overcharging.

Figure 6:
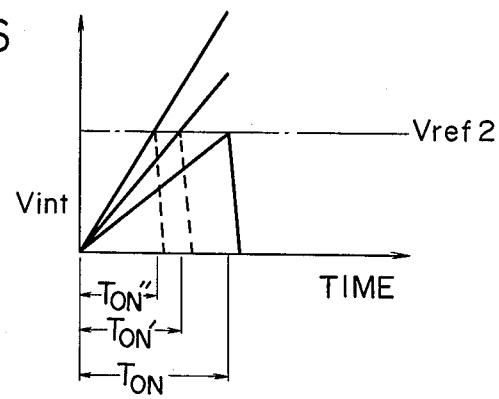
FIG. 6 is a graph plotted with variation in on-interval $T_{ON}$ for explanation of operation of the embodiment of FIG. 5.

Attention is turned to another situation where the supply voltage of the alternating current voltage supply 1 is high typically 260 volts. In this case, the output of the rectifier 2 or the input voltage $V_{IN}$ to the inverter 3 is matter-of-factly higher than that when the supply voltage is 100 volts. It is also obvious from the above equation (1) that the gradient of the varying primary current I1 through the primary coil 41 also increases. Should the circuit arrangement for controlling the on-interval $T_{ON}$ as taught by the present invention be absent, the troubles would come up as pointed out with regard to the prior art. However, if the gradient of variations in the input current I1 increases in the above illustrated embodiment, then the voltage V3 induced on the tertiary coil 111 included in the voltage generator 11 also increases in proportion to the input voltage $V_{IN}$ pursuant to the equation (10). For this reason the period of time necessary for the output voltage Vint of the integrating circuit 12 to amount to the reference voltage Vref2 of the voltage comparator 14 becomes shorter in inverse proportion to such an increase in the input voltage $V_{IN}$. The result is that the on-interval $T_{ON}$ of the switching transistor 51 also becomes shorter. In FIG. 6, $T_{ON}$ represents the situation where the supply voltage is 100 volts and $T_{ON}''$ represents that where the supply voltage is for example 260 volts. Since the on-interval $T_{ON}$ of the switching transistor 51 becomes shorter with an increase in the supply voltage in this manner, the average value $\overline{IO}$ of the charging current supplied to the rechargeable battery 9 is eventually kept substantially constant with no possible overcharging or other troubles.

It is noted that a diode 64 is further provided in the trigger signal generator 6 included within the inverter 3 according to the embodiment of FIG. 5. This diode 64, combined with a resistor 62, functions to elongate the on-interval $T_{ON}$ of the switching transistor 51 and prohibit a current flowing through a resistor 61 from increasing with an increase in the input voltage $V_{IN}$, thus reducing power dissipation to a minimum. The results of experiments on electric shavers incorporating the embodiment of FIG. 5 indicate that a temperature rise in the housings (not shown) for the electric shavers was below 20° C. in both cases when the supply voltage of the alternating current supply was 100 volts and 260 volts.

Figure 7:
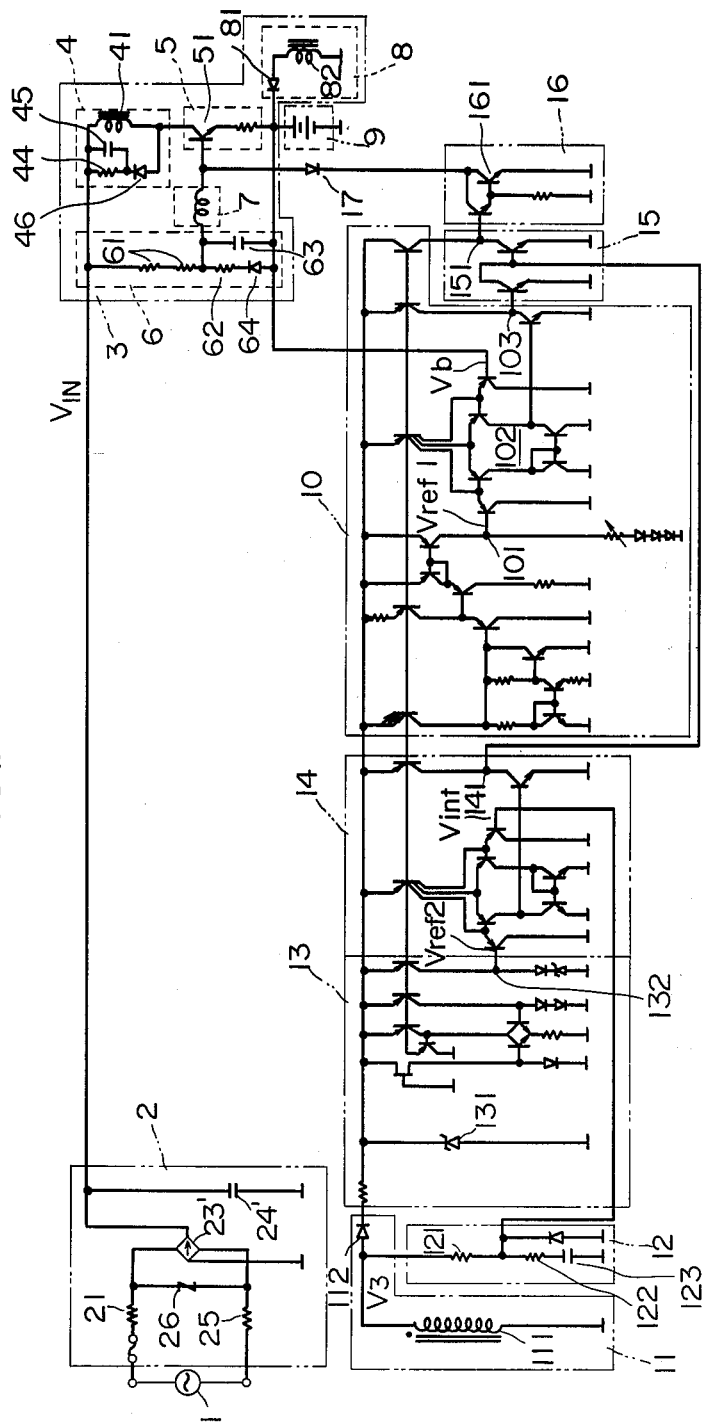
FIG. 7 is a circuit diagram showing a modification in the embodiment of FIG. 5.

FIG. 7 is a circuit diagram showing a modification in the embodiment of FIG. 5. The distinction of this embodiment over that of FIG. 5 lies with provision of a power converter 4 in the inverter 3. In other words, in the embodiment of FIG. 7, a spike voltage absorber circuit is connected in parallel with the primary coil 41. The spike voltage absorber circuit comprises a parallel circuit of a resistor 44 and a capacitor 45 and a diode 46 connected serially to the parallel circuit. Operation and effect of the spike voltage absorber circuit will be more fully understood from description of an embodiment of FIG. 12. Briefly speaking, the spike voltage absorber circuit functions to prevent a current from flowing through the resistor 44 during the on-interval $T_{ON}$ of the switching transistor and minimize power dissipation during the on-interval $T_{ON}$, thus insuring high degree of efficiency.

Figure 8:
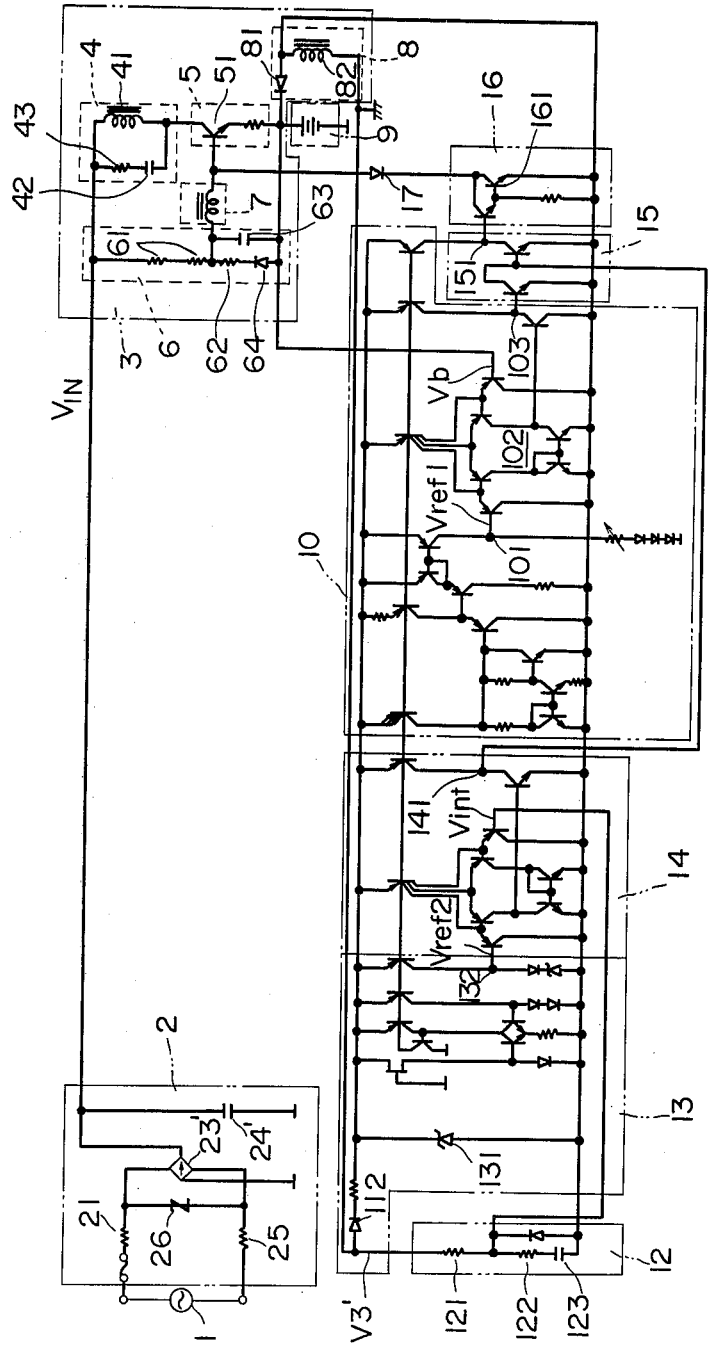
FIGS. 8 to 11 are detailed circuit diagrams showing other preferred embodiments constructed pursuant to the principle of the block diagram of FIG. 3.

FIG. 8 is a detailed circuit diagram showing still another preferred embodiment of the present invention. This embodiment is different from that of FIG. 5 in that the voltage generator 11 serves also as the secondary output rectifier 8 included in the inverter 3. For this reason a voltage V3' corresponding to the voltage V3 in FIG. 5 is derived from a secondary coil 82 of the oscillation transformer. The junction between the secondary coil 82 and a rectifying diode 81 is connected to the negative side of the respective circuits 12, 13, 14, 15 and 16 with the opposite terminal of the coil 82 being connected to the positive side of the integrating circuit 12 and the anode of a rectifying diode 112. A voltage is developed across the primary coil 41 when the current I1 flows through the primary coil 41 or while the switching transistor 51 is in the on-interval $T_{ON}$. However, by the action of the diode 81 the voltage developed during that period $T_{ON}$ has no effect on the charging current to the rechargeable battery 9. The charging of the rechargeable battery 9 is achieved in a way similar to the embodiment of FIG. 5 with a voltage of an opposite polarity developed on the coil 82 during the off-interval $T_{OFF}$ of the switching transistor 51. The embodiment of FIG. 8 permits small-sized implementations of the oscillation transformer in contrast to that of FIG. 5 because of no need to provide the tertiary coil 111 differently from that of FIG. 5. In the embodiment of FIG. 8, the reference voltage Vref2 should probably be established at a value different from that in the embodiment of FIG. 5.

Figure 9:
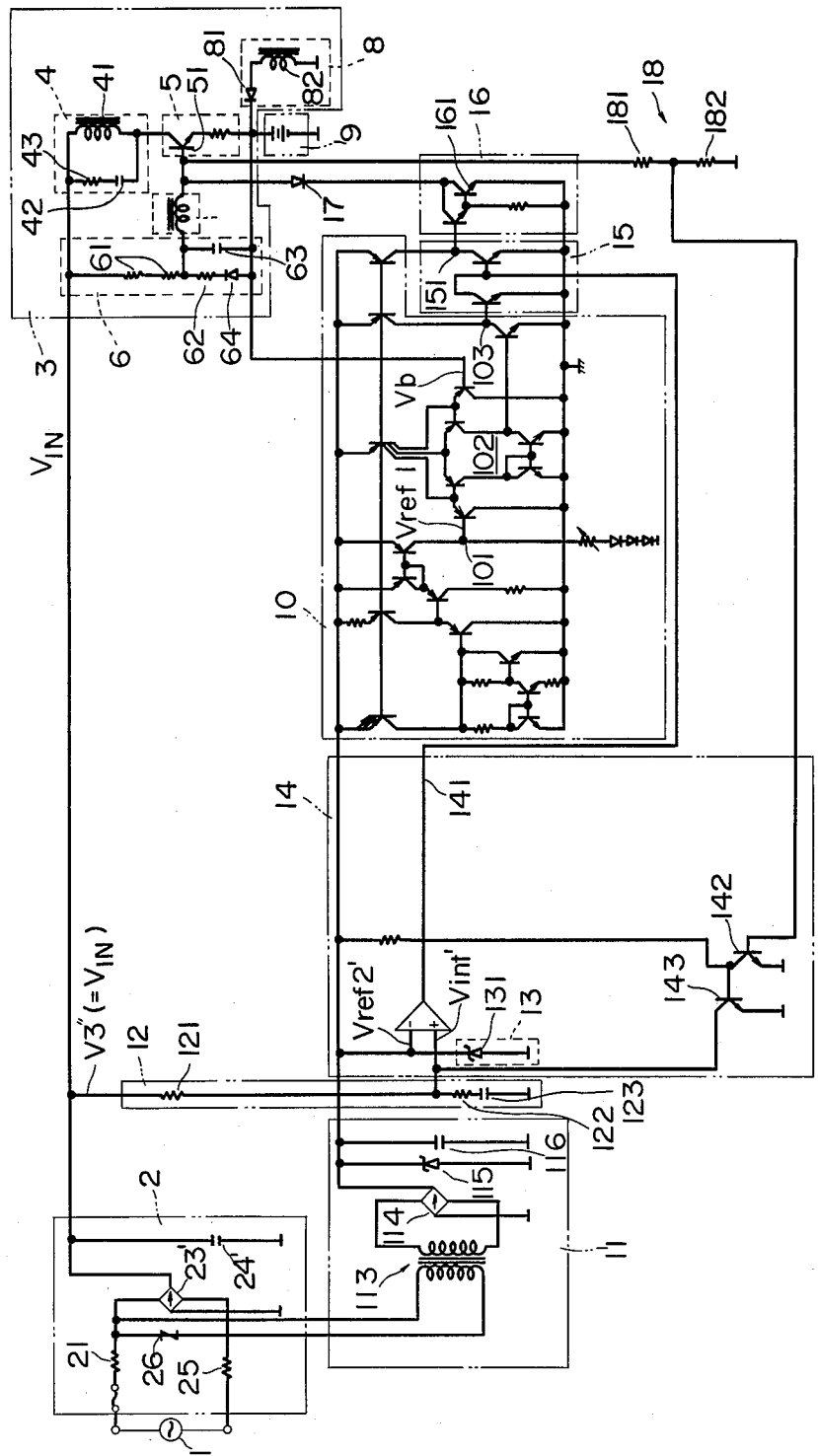

FIG. 9 is a detailed circuit diagram of another preferred embodiment of the present invention. In the embodiment of FIG. 9, the supply voltage to the circuits 10, 14, 15 and 16 are provided by the voltage generator 11 which differs from that in the embodiment of FIG. 5. The voltage generator 11 includes an attenuating transformer 113 supplied with the supply voltage from the alternating current voltage supply 1. The secondary output of the attenuating transformer 113 is rectified through a full-wave rectifier 114 and stabilized through a zener diode 115. A direct current voltage stabilized by the zener diode 115 and smoothed by a capacitor 116 is furnished to the respective circuits 14, 10, 15 and 16. The input of the integrating circuit 12 is supplied with the output of the rectifier 2 or the input voltage $V_{IN}$ in terms of the proportional voltage V3". The voltage comparator 14 includes a pair of transistors 142 and 143. The base of the transistor 142 is connected to a voltage divider 18. In other words, the voltage divider 18 divides the base voltage of the switching transistor 51 included in the inverter 3 by means of a pair of resistors 181 and 182 with the thus divided voltage being fed to the base of the transistor 142. The collector of the transistor 142 is connected to the base of the transistor 143 and to a direct current voltage supply. The two transistors 142 and 143 are grounded at its emitter. The collector of the transistor 143 is connected to the output of the integrating circuit 12 or an input (+) to the voltage comparator. These transistors 142 and 143 permits the discharging of the charge on the capacitor 123 in the integrating circuit 12 during the off-interval $T_{OFF}$ of the switching transistor 51, thus resetting the integrating circuit 12 into its initial state. Contrarily, if the switching transistor 51 is in its on condition or during the on-interval $T_{ON}$, the transistor 142 is in its on condition and the other transistor 143 is in its off condition so that the capacitor 123 is charged from the proportional voltage V3" or the input voltage $V_{IN}$. Moreover, in the embodiment of FIG. 9, the reference voltage Vref2 should probably be established at a value different from that in FIG. 5.

Figure 10:
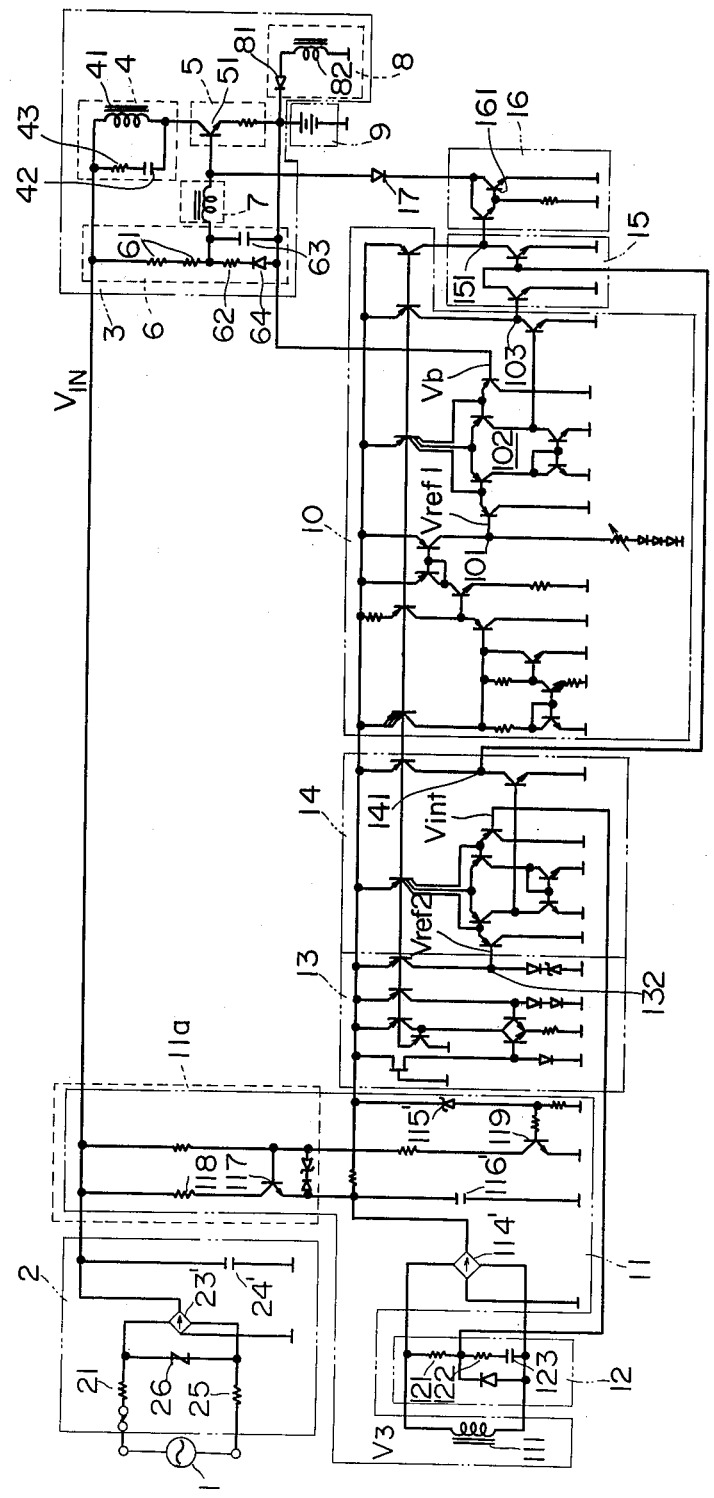

FIG. 10 is a detailed circuit diagram of another preferred embodiment of the present invention. The embodiment of FIG. 10 provides capability of properly setting the charging current during trickle charging and providing stable control for the on-interval $T_{ON}$ in the case where the rechargeable battery 9 is of a relatively small capacity. If the supply voltage of the alternating current voltage supply 1 is 260 volts, then the peak value of the input amounts up to approximately 370 volts. In such a case that the supply voltage of the alternating current voltage supply 1 is very high, the charging completion detector 10 operates so that the on-interval $T_{ON}$ of the switching transistor 51 becomes very short (typically, of the order of 0.21 microsecond) at the end of the charging of the rechargeable battery 9. As noted earlier, in the embodiment of FIG. 5, the circuits 10, 14, 15, 16 and so on are supplied as its enabling voltage with the output voltage V3 of the tertiary coil 111 included in the voltage generator 11. It is only when the primary current I1 flows or when the switching transistor 51 is in the on-interval $T_{ON}$ that the induced voltage appears across the tertiary coil 111. More particularly, the induced voltage appears across the tertiary coil 111 within 0.2–1 μsec. There is therefore a requirement that the voltage comparator 14 and the voltge comparator 102 included in the charging completion detector 10 exhibit a fully quick response. As a rule, the conventional small size transistor has a response delay on the order of approximately 0.1–0.8 μsec. In some cases, the embodiment of FIG. 5 has great difficulty in providing stable and reliable control for the on-interval $T_{ON}$ of the switching transistor 51 at the end of the charging of the rechargeable battery 9.

To this end the embodiment of FIG. 10 additionally includes a series regulator 11a in the voltage generator 11. The voltage generator 11 is further provided with a full-wave rectifier 114' which full-wave rectifies the induced voltage across the tertiary coil 111. The output of the full-wave rectifier 114' is smoothed via a capacitor 116' and supplied as the enabling voltage to the circuits 10, 14, 15 and 16. The series regulator 11a includes a transistor 117 whose base is connected to the output of the rectifier by way of a resistor, the collector is connected to the output of the rectifier 2 via a resistor 118. The base of the transistor 117 is connected to the collector of another transistor 119 with its base being connected to the output of the full-wave rectifier 114' through a zener diode 115'.

In operation, when the battery voltage Vb of the rechargeable battery 9 is less than the reference voltage Vref1 of the charging completion detector 10, in operation, the full-wave rectifier 114' rectifies the induced voltage on the tertiary coil 111 resulting from the primary coil 41 in order to provide the above-mentioned enabling voltage. The full-wave rectifier 114' further rectifies the induced voltage V3 on the tertiary coil 111 resulting from the secondary coil 82 in order to provide the above-mentioned enabling voltage.

Thereafter, if the battery voltage Vb of the rechargeable battery 9 reaches the reference voltage Vref1, then the rechargeable battery 9 is about to complete its charging and the inverter 3 performs its oscillation in an interrupted manner. Such interrupted oscillation of the inverter 3 is necessary in order to prevent overcharging of the rechargeable battery of a relatively small capacity. However, provided that oscillation takes place in an intermittent manner in the inverter 3, it is impossible to supply the enabling voltage to the circuits 10, 14 and so on uring the period of time where the inverter 3 discontinues oscillating. This results in incapability to provide stable control for the on-interval $T_{ON}$. However, in the embodiment of FIG. 10, the transistor 119 is turned off when the enabling voltage for the circuits 10, 14 and so on is below a fixed value as determined by the zener diode 115'. The transistor 119 in its off condition increases the base voltage of the transistor 117 and turns on the transistor 117. Once the transistor 117 has been placed into its on condition, a division of the output of the rectifier 2 through the resistor 118 is supplied as the enabling voltage to the circuits 10, 14 and so on. Since the current flowing through the resistor 118 and the transistor 118 may be limited within the range of 2-3 mA under these circumstances, power dissipation originating from the transistor 117 and the resistor 118 may be smaller than a total of loss of the switching transistor 51 and iron loss of the oscillation transformer. Accordingly, there is neither heat dissipated from the transistor 117 or the resistor 118 nor exceptionally high temperature in the housing for the electric appliance incorporating the embodiment of FIG. 10. In this way, the embodiment of FIG. 10 insures stable control at the end of the charging of the rechargeable battery.

Figure 11:
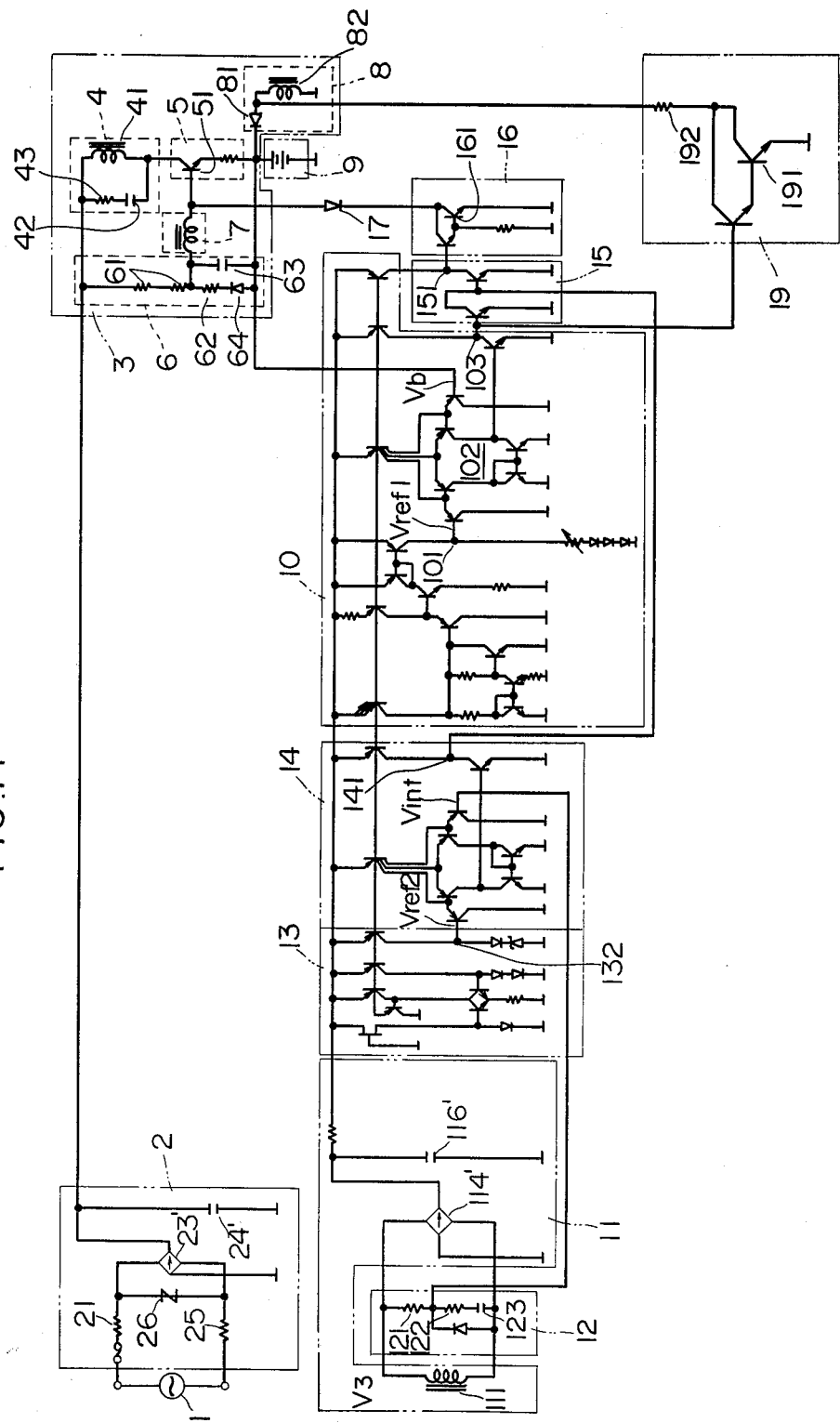

FIG. 11 shows a modification in the embodiment of FIG. 10. This embodiment of FIG. 11 is adapted without using the series regulator 11a, the transistor 119 and the zener diode 115' as in FIG. 10, to provide compactness of the charger. In the embodiment of FIG. 11, there is provided a charging current bypass circuit 19. The charging current bypass circuit 19 includes a switching transistor 191 which has its collector connected to the junction between the secondary coil 82 of the oscillation transformer and the rectifying diode 81 via a resistor 192. In response to the output 103 of the charging completion detector 10, the switching transistor 191 is controlled between its on and off positions. The embodiment of FIG. 11 permits the inverter 3 to oscillate after the completion of the charging of the rechargeable battery 9 and the induced voltage to be constantly developed across the tertiary coil 111 included in the voltage generator 11, thus supplying the enabling voltage to the circuits 10, 14 and so on at all times. The reference voltage Vref1 of the charging completion detector 10 is selected in the embodiment of FIG. 11 such that the output 103 of the detector 10 assumes the low level when the battery voltage Vb of the rechargeable battery 9 stands between the turning points X and Y on the curve Al in FIG. 4. With the output 103 of the detector 10 assuming the low level, the switching transistor 191 in the bypass circuit 19 is in its off condition. Thereafter, when the charging of the rechargeable battery 9 proceeds and the battery voltage Vb is present anywhere between the turning points Y and Z in FIG. 4, the charging completion detector 10 provides the output 103 of the high level. Then, the switching transistor 191 included in the bypass circuit 19 is turned on. In response to the switching transistor 191 being turned on, the output current from the secondary coil 82 flows into the ground through a resistor 192 and that transistor 191 and the charging current to be supplied to the rechargeable battery 9 decreases by the amount of the current flowing into the ground. In summary, upon the charging of the rechargeable battery 9 the charging thereof is performed again with a rather decreased amount of charging current as in trickle charging. The charging current for trickle charging may be kept at its optimum value through proper selection of the resistor 192 included in the bypass circuit 19.

Figure 12:
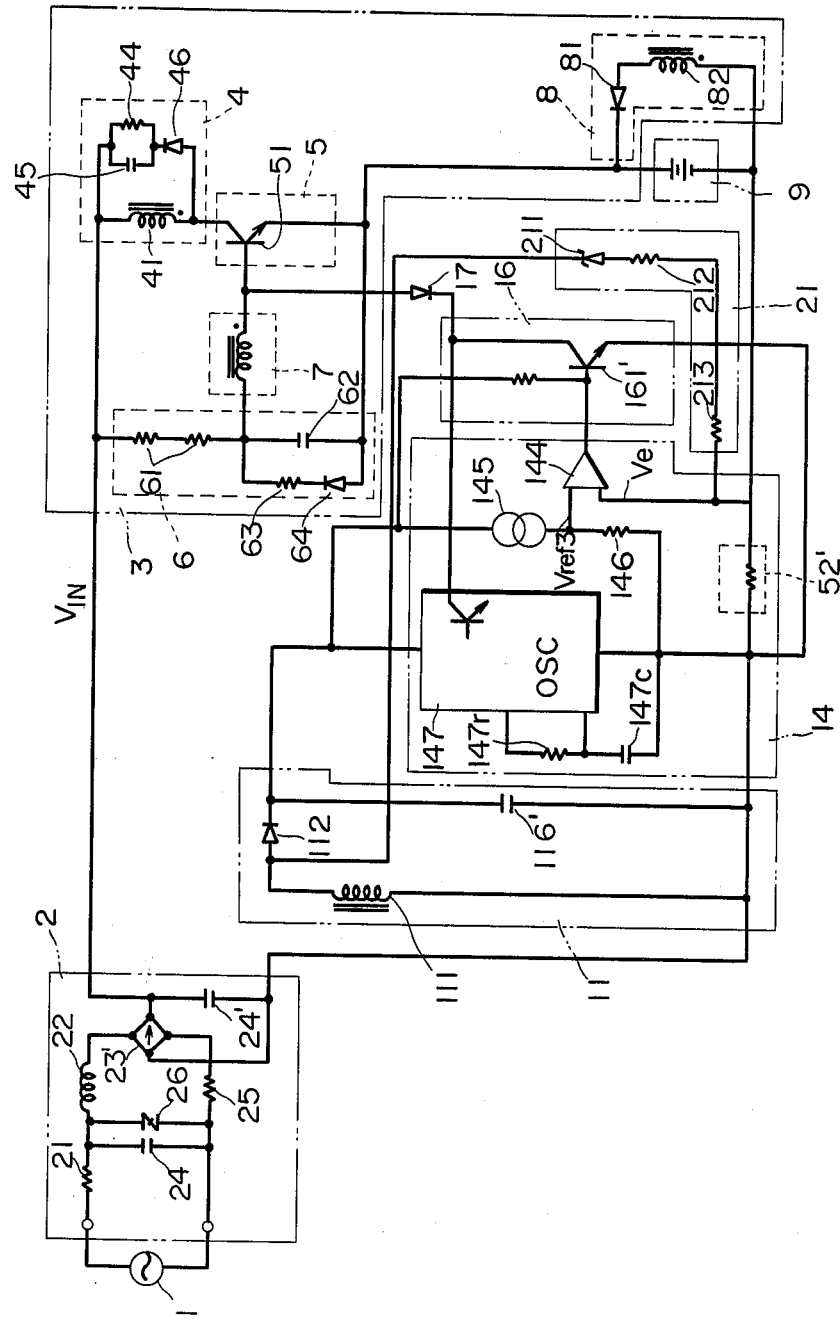
FIG. 12 is a circuit diagram of still another preferred embodiment of the present invention.

FIG. 12 is a detailed circuit diagram of another embodiment of the present invention. In the previous embodiments of FIGS. 5 to 11, the on-interval $T_{ON}$ is controlled in such a manner as to keep constant electromagnetic energy $\Delta E1$ cumulated on the core of the oscillation transformer and in other words the charging current to be supplied to the rechargeable battery 9 or the secondary current $\overline{IO}$. In contrast to those embodiments, the embodiment of FIG. 12 is adapted to control the on-interval $T_{ON}$ in such a manner as to keep constant the peak value I1p of the primary current I1 and thus the secondary current $\overline{IO}$. To this end the emitter resistor is interposed as a resistor 52' in a current path for the primary current I1 being the rechargeable battery 9 instead of being connected directly to the emitter of the switching transistor 51 in the switching circuit 5 as in the previous embodiments. The voltage appearing between both ends of the emitter resistor 52' is compared with a predetermined reference voltage Vref3 to control the on-interval $T_{ON}$ of the switching transistor 51. It is understood that a portion of circuit structure corresponding to the charging completion detector as in the previous embodiments is omitted for the sake of illustration only. The inverter 3 in the embodiment of FIG. 12 is substantially similar to those in the previous embodiments except that the resistor is not connected directly to the emitter of the switching transistor 51 in the switching circuit 5. A resistor 25 in the rectifier 2 is to protect the charger against an excessive current on the secondary circuit. A varistor 26 in the rectifier 2 is similar to that in the previous embodiments with the view of protecting the transistors and so on in the charger against an incoming surge current including a lightening current.

As in the embodiment of FIG. 5, the output of the voltage generator 11 is supplied as a voltage source to a voltage comparator 14'. The voltage comparator 14' includes the above-mentioned emitter resistor 52' in association with the switching transistor 51. One end of the emitter resistor 52' is connected to one input to a voltage comparator 144 to provide a voltage Ve thereto. The other input to the voltage comparator is supplied with the reference voltage Vref3 from one end of a resistor 146 connected to a constant current supply 145. The output of the voltage comparator 144 is supplied to the base of a switching transistor 161' included in the switching control circuit 16. One of features of this embodiment resides in provision of an oscillator 147 in the voltage comparator 14'. As stated below, the oscillator 147 functions to make the oscillation period T of the inverter 3 constant and allow great flexibility of circuit design. The oscillation frequency of the oscillator 147 may be varied by a resistor 147r and/or a capacitor 147c. The output of the oscillator 147 is connected to the collector of the above described switching transistor 161' whose collector is connected to the base of the switching transistor 51 by way of the reversely connected diode 17. Another feature of this embodiment is provision of a compensator 21. This compensator 21 includes a series connection of a zener diode 211 supplied with the output voltage of the tertiary coil 111 included in the voltage generator 11 and a pair of resistors 212 and 213. The other end of the resistor 213 is connected to one end of an emitter resistor 52''.

Likewise the embodiment of FIG. 7, this embodiment in FIG. 12 includes the spike voltage absorber circuit incorporated into the power converter 4 in the inverter 3. Within the power converter 4 there is provided the diode 46 connected in series with to the parallel circuit of the resistor 44 and the capacitor 45. This series connection is connected in parallel with both ends of the primary coil 41. By the action of the diode 46 the spike voltage absorber circuit prevents a current from flowing through the resistor 44 during the on-interval $T_{ON}$ of the switching transistor 51 with a minimum of power dissipation during the on-interval $T_{ON}$.

Figure 13A:
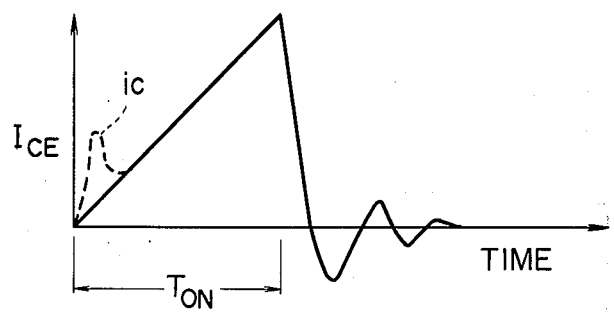
FIGS. 13A to 13C are graphs for explanation of the effects of a spike voltage absorber circuit in the embodiment of FIG. 12.
Figure 13B:
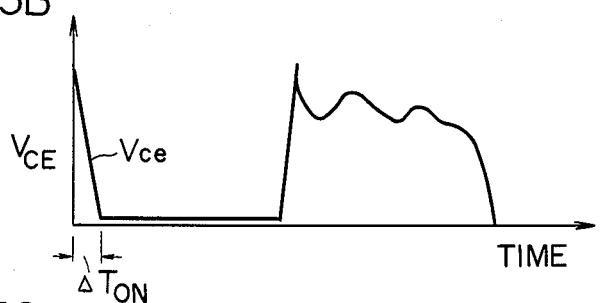
Figure 13C:
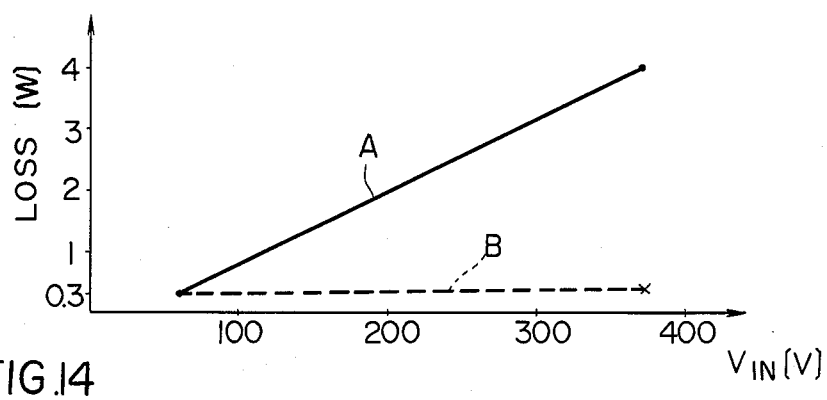

Operation and effect of the spike voltage absorber circuit will now be described by reference to FIGS. 13A to 13C. FIG. 13A depicts the collector-emitter current ($I_{CE}$) of the switching transistor 51 whereas FIG. 13B depicts the collector-emitter voltage ($V_{CE}$) of that transistor 51. FIG. 13C is a graph for explanation of the effect of the spike voltage absorber circuit with abscissa indicating the input voltage $V_{IN}$ and ordinate indicating power loss. For example, if the spike voltage absorber circuit as in FIG. 5 is absent, then current ic as shown in FIG. 13A is superimposed on the current I1 by the effect of discharging current from the capacitor 42 (FIG. 5) at the initial stage of the on-interval $T_{ON}$ of the switching transistor 51. The greater the discharging current ic the greater the input voltage $V_{IN}$. The period of time $\Delta T_{ON}$ necessary for the collector-emitter voltage $V_{CE}$ to reduce to substantially zero is between about 500 nanosecond and about 1 (one) microsecond. There is collector loss at the switching transistor 51 during such period $\Delta T_{ON}$. However, the spike voltage absorber circuit installed in the embodiments as shown in FIGS. 12 and 7 prevents such discharging current from being superimposed on the primary current I1 by means of the diode 46 which blocks the current through the capacitor 45 during the on-interval $T_{ON}$ of the switching transistor 51. According to this embodiment power loss of the switching transistor 51 is completely removed during the on-interval $T_{ON}$ by the effect of the diode 46. In FIG. 13C, the solid line A depicts loss caused during the on-interval $T_{ON}$ in the absence of the spike voltage absorber circuit and the dotted line B depicts that in the embodiment in FIG. 12 (as well as in FIG. 7). It is clear from FIG. 13C that power loss of the switching transistor 51 shows no substantial increase during the on-interval $T_{ON}$ with an increase in the input voltage $V_{IN}$ with an accompanying relative increase in efficiency $\eta$ provided that the spike voltage absorber circuit is in use.

The on-interval $T_{ON}$ of the switching transistor 51 is controlled in the embodiment of FIG. 12 as follows: Evaluating from equations (3) and (4), $\overline{IO}$ can be represented by equation (11):

$$\overline{IO} = \frac{1}{2} \cdot \frac{n1}{n2} \cdot I1_p \cdot \frac{T_{OFF}}{T} \quad (11)$$

$$= K4 \cdot I1_p \cdot \frac{T_{OFF}}{T}$$

$$K4 = \frac{1}{2} \cdot \frac{n1}{n2}$$

In order to keep the average value $\overline{IO}$ of the output current IO constant, it is necessary to make (I1$_p \cdot T_{OFF}$/T) constant. It is also noted that the length of the off-interval $T_{OFF}$ of the switching transistor 51 varies in proportion to the energy $\Delta E1$ accumulated on the core of the oscillation transformer during the on-interval $T_{ON}$. In other words, an increase in $\Delta E1$ causes an elongated $T_{OFF}$ and a decrease in $\Delta E1$ causes a shortened $T_{OFF}$. As long as the energy $\Delta E1$ accumulated on the core of the oscillation transformer is maintained fixed, it becomes possible to keep the length of the off-interval $T_{OFF}$ constant. It is also obvious from the foregoing equation (2) that the energy $\Delta E1$ is proportional to the square of the peak value of the primary current or I1$_p^2$. This implies that all that is necessary to obtain an unchangeable off-interval $T_{OFF}$ is to keep the peak value I1p of the primary current constant with regard to the input voltage $V_{IN}$. In this embodiment, the emitter resistor 52' is interposed at the point as shown in the drawings to provide a direct readout of the peak value I1p of the primary current. A voltage drop Ve developing across the emitter resistor 52' is supplied as an input to the voltage comparator 144 which also receives as its other input the reference voltage Vref3 as defined by the resistor 146. The voltage comparator 146 compares Ve and Vref3. When the voltage Ve is equal to or higher than the reference voltage Vref3, the output of the voltage comparator 144 assumes the high level. Accordingly, a switching transistor 161' is turned on. The voltage Ve is given by equation (12):

$$Ve = Re \cdot I1p \quad (12)$$

wherein Re is the resistance of the emitter resistor 52'. By sensing the voltage Ve it is possible to keep the peak value I1p of the primary current at a fixed value.

The compensator 21 which is another significant feature of the embodiment of FIG. 12 will now be discussed. If the input voltage $V_{IN}$ or the output of the voltage generator 11 exceeds a given value, then current $\Delta I1$ proportional to the amplitude of the primary current I1 flows through the series connection in the compensator 21. An applied voltage to the zener diode 211 in the compensator 21 in excess of the zener voltage of the zener diode 211 permits flowing of that current $\Delta I1$. The voltage Ve appearing between both ends of the emitter resistor 52' can be defined by equation (12'):

$$Ve = Re(I1p + \Delta I1) \qquad (12')$$

Provided the voltage Ve is equal to the reference voltage Vref3 in the embodiment of FIG. 12, the switching transistor 51 is forced into its off condition. The relationship between the voltage Ve and the reference voltage Vref3 can be thus defined by equation (13):

$$\begin{aligned} Vref3 &= Ve \\ &= Re\,(I1p + \Delta I1) \\ &= Re \cdot I1p + Re \cdot \Delta I1 \end{aligned} \qquad (13)$$

Under these circumstances, the peak value I1p of the primary current I1 is written by equation (14):

$$I1p = \frac{Vref3}{Re} - \Delta I1 \qquad (14)$$

Figure 14:
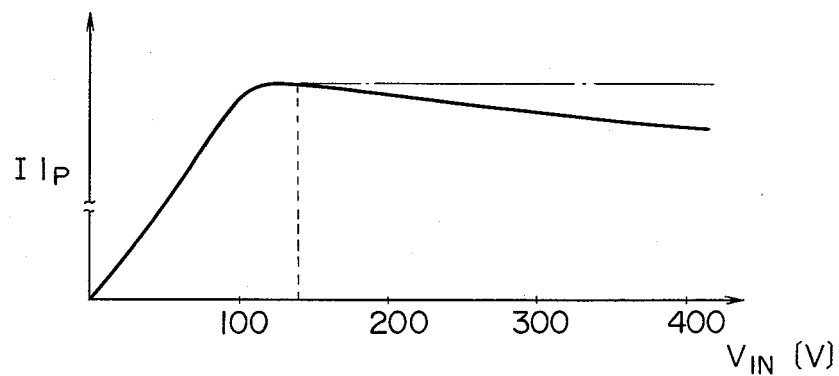
FIG. 14 is a graph for explanation of the relationship between peak primary winding current and input voltage.

The above equation (14) indicates that the current $\Delta I1$ increases with an increase in the supply voltage of the alternating current supply or the input voltage $V_{IN}$. As seen from FIG. 14, the peak value I1p of the primary current decreases with an increase in the input voltage $V_{IN}$. This implies that the on-interval $T_{ON}$ of the switching transistor 51 should not be too short even when the supply voltage of the alternating current supply 1 is high. The compensator eliminates the need to use the switching transistor 51 with a quick response and provides further simplicity in structure. It is noted that in FIG. 14 the point in time where the peak value I1p of the primary current starts decreasing is determined by the zener voltage of the zener diode 211.

Figure 15A:
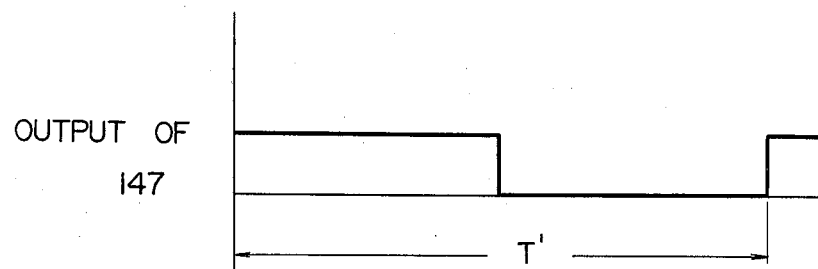
FIGS. 15A to 15D are graphs for explanation of operation of an oscillator in the embodiment of FIG. 12.
Figure 15B:
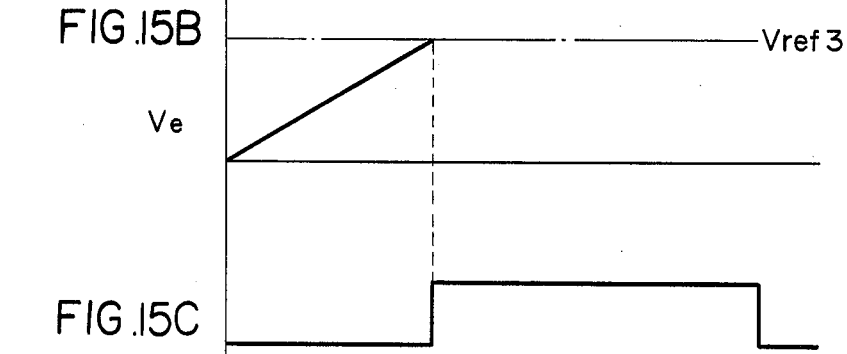
Figure 15C:
Figure 15D:
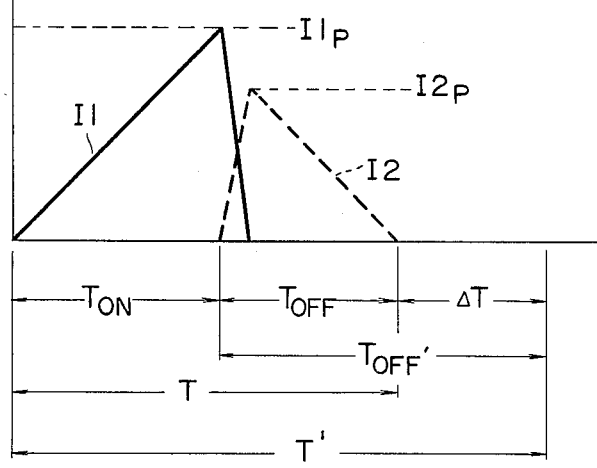

With reference to FIGS. 15A to 15D, operation and effect of the oscillator 147 which is still another feature of the embodiment of FIG. 12 will be explained below. FIG. 15A shows the output of the oscillator 147, FIG. 15B shows the voltage Ve at the emitter resistor 52' and FIG. 15C shows the output of the voltage comparator 144. In addition, FIG. 15D shows the primary and secondary currents I1 and I2 of the inverter 3. As stated previously, the voltage Ve increases in accordance with the primary current I1 (or I1+$\Delta I1$). If the voltage Ve reaches the predetermined reference voltage Vref3, then the voltage comparator 144 provides its high level output. The switching transistor 161' is thus turned on and the switching transistor 51 in the inverter 3 is on the way of being turned off. As denoted by the dotted line in FIG. 15D, the secondary current I2 flows through the secondary coil 82. The secondary current flows during the off-interval $T_{OFF}$. The output of the oscillator 147 has a period T' longer than the natural oscillation period T of the inverter 3 as seen from FIG. 15A. The output of the oscillator 147 assumes the low level immediately after the on-interval $T_{ON}$, as indicated in FIG. 15A. If the output of the oscillator 147 assumes the low level in this manner, then the base current to be supplied to the switching transistor 51 flows via the diode 17 into an output transistor included in the oscillator 147. Therefore, while the output of the oscillator 147 is at the low level, the switching transistor 51 is turned on in no way. Since the oscillation period T' of the oscillator 147 is longer than the natural oscillation period T of the inverter, there is a short period $\Delta T$ between the off-interval $T_{OFF}$ of the switching transistor 51 and the point in time where the switching transistor 51 is turned on. As a result, the off-interval of the switching transistor 51 extends from $T_{OFF}$ without the oscillator 147 to $T_{OFF}'$ $(=T_{OFF}+\Delta T)$. Through proper selection of the period T' and duty ratio of the oscillator 147 the average value IO of the charging current IO to the rechargeable battery 9 may be set at its optimum value. It is noted that the period T' is determined through adjustments of the resistor 147r and/or the capacitor 147c.

Should the oscillator 147 for controlling the oscillation period of the inverter 3 be absent as in the previous embodiments, the oscillation period T of the inverter 3 is determined primarily by the sum of the on-interval $T_{ON}$ and the off-interval $T_{OFF}$ of the switching transistor 51. In this instance, the current I1p, the on-interval $T_{ON}$ and the off-interval $T_{OFF}$ are selected to be constantly unchangeable at the stage of circuit design. It is also appreciated that the oscillation period T of the inverter 3 varies with the inductance and the number of turns of the coils of the oscillation transformer or $h_{fe}$ of the switching transistor 51. If the period T varies, then failure to vary the length of the off-interval $T_{OFF}$ results in causing variations in the average value $\overline{IO}$ of the output current as seen from the above equation (4). For these reasons the inductance L1 and the number of turns n1 of the primary coil 41, the inductance L2 and the number of turns n2 of the secondary coil 82 and $h_{fe}$ of the transistor 51 should be carefully selected at the stage of design. Designing requires a considerable amount of time to consider. In the case where the oscillation period of the inverter 3 is determined mainly by the period T' of the oscillator as in the embodiment of FIG. 12, it is possible to adjust accurately the average value IO of the output current with proper adjustments of the period T'. For example, an increase in the period T' causes a decrease in the current $\overline{IO}$ and a decrease in T' causes an increase in $\overline{IO}$. In this manner, the oscillator allows great flexibility in design of the charger.

Furthermore, the length of the on-interval $T_{ON}$ of the switching transistor 51 is controlled depending on the amplitude of the input voltage $V_{IN}$. With an increase in the input voltage $V_{IN}$, the on-interval $T_{ON}$ becomes shorter. In the case where the input voltage $V_{IN}$ is extremely high and the capacity of the rechargeable battery 9 is small, the on-interval $T_{ON}$ should be extremely short in some cases. Due to response characteristics of the switching transistor 51 it will be unable to shorten the on-interval $T_{ON}$ to a desirable extent. In this case the output current $\overline{IO}$ will be too high with possibility of overcharging. However, there is no serious problem in connection with response of the switching transistor 51 in the embodiment of FIG. 12 where it is possible to decrease the average value $\overline{IO}$ of the output current by elongating the oscillation period T' of the oscillator 147. In this aspect this embodiment provides further flexibility of circuit design.

When the battery voltage Vb is low as at the end of discharging of the rechargeable battery 9, the base-emitter voltage ($V_{BE}$) of the switching transistor 51 tends to increase promptly before the output current I decreases to zero. While the electromagnetic energy ΔE1 remains on the core of the oscillation transformer, the switching transistor 51 is placed into its on position again. However, under these circumstances the remaining energy neither causes reversal of a current nor triggers oscillation. The switching transistor 51 dissipates heat and eventually becomes damaged. According to the embodiment of FIG. 12, the provision of the oscillator 147 permits the turning on of the switching transistor 51 only after the electromagnetic energy ΔE1 has been fully discharged or upon the lapse of an allowance time ΔT. This overcomes the problem which is caused by heat generated from the switching transistor 51.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A charging apparatus for a rechargeable battery, comprising:
an alternating current voltage source for supplying an A.C. input voltage;
rectifying means for converting said A.C. input voltage to a D.C. input voltage;
inverter means receiving the D.C. input voltage from said rectifying means,
said inverter means including,
an oscillating transformer having a primary winding, a secondary winding and a feedback winding,
a semiconductor switch means inserted in a current path of said primary winding, and
means receiving the D.C. input voltage from said rectifying means for providing an on signal to said semiconductor switch means through said feedback winding,
said primary winding receiving the output from said rectifying means, said secondary winding being connected to a rechargeable battery through a rectifying element,
a fourth winding coupled to said oscillating transformer;
means for rectifying the voltage obtained from said fourth winding in synchronism with an oscillating period of said inverter means for generating a source voltage; and
control means responsive to said source voltage, said control means including,
voltage comparing means receiving at one input thereof a predetermined reference voltage,
means for supplying a comparison voltage associated with said source voltage to the other input of said voltage comparing means,
said voltage comparing means providing an output if and when said comparison exceeds said reference voltage,
means responsive to the output from said voltage comparing means for forcedly turning said semiconductor switch means off,
the on time period of said semiconductor switch means being approximately reversely proportional to the magnitude of said D.C. input voltage, whereby the charging current of the rechargeable battery coupled to said secondary winding is maintained approximately constant.

2. A charging apparatus in accordance with claim 1, wherein means for supplying said comparison voltage comprises:
an integrating circuit coupled to the output terminal of said fourth winding and including a plurality of series resistors and a capacitor connected between said resistors and a reference potential, and
a constant voltage diode coupled between the output terminal of said fourth winding and said reference potential;
said comparison voltage being derived from the output voltage from a junction between said series resistors, said comparison voltage being proportional to said D.C. input voltage.

3. A charging apparatus in accordance with claim 1, wherein:
said means for supplying said comparison voltage comprises:
a series circuit including a constant voltage diode and a resistor coupled to the output terminals of said fourth winding for allowing for a flow of current when said comparison voltage exceeds a predetermined value, and
a resistor inserted in a current path of said semiconductor switch means and connected at one end thereof to said series circuit,
whereby the current flowing through said series circuit and the current flowing through said semiconductor switch flow through said resistor, whereby the voltage of said resistor is proportional to said D.C. input voltage.

4. A charging apparatus in accordance with claim 1, further comprising:
charging completion detecting means for preventing overcharging of said rechargeable battery,
the output of said charging completion detection means being applied to said means for forcedly turning off said semiconductor switch means; and
said semiconductor switch means being forcedly turned off responsive to either the output from said voltage comparing means or said charging completion detecting means.

5. A charging apparatus in accordance with claim 2, further comprising:
charging completion detecting means for preventing overcharging said rechargeable battery,
the output of said charging completion detection means being applied to said means for forcedly turning off said semiconductor switch means, and
said semiconductor switch means being forcedly turned off responsive to either the output from said voltage comparing means or said charging completion detecting means.

6. A charging apparatus in accordance with claim 3, further comprising:
charging completion detecting means for preventing overcharging said rechargeable battery,
the output of said charging completion detection means being applied to said means for forcedly turning off said semiconductor switch means, and
said semiconductor switch means being forcedly turned off responsive to either the output from said voltage comparing means or said charging completion detecting means.

* * * * *